Sept. 3, 1929.  A. A. KUCHER  1,727,014
AIRCRAFT
Filed Dec. 27, 1926  4 Sheets-Sheet 1

A. A. Kucher
INVENTOR

BY  *HASteiger*
ATTORNEY

Sept. 3, 1929.    A. A. KUCHER    1,727,014
AIRCRAFT
Filed Dec. 27, 1926    4 Sheets-Sheet 2

A. A. Kucher
INVENTOR

BY
ATTORNEY

Sept. 3, 1929.  A. A. KUCHER  1,727,014
AIRCRAFT
Filed Dec. 27, 1926  4 Sheets-Sheet 3

A. A. Kucher
INVENTOR

Sept. 3, 1929.  A. A. KUCHER  1,727,014
AIRCRAFT
Filed Dec. 27, 1926  4 Sheets-Sheet 4

WITNESSES:
E. Lutz.

A.A. Kucher
INVENTOR

BY Wasteiger
ATTORNEY

Patented Sept. 3, 1929.

1,727,014

UNITED STATES PATENT OFFICE.

ANDREW A. KUCHER, OF CHESTER, PENNSYLVANIA.

AIRCRAFT.

Application filed December 27, 1926. Serial No. 157,236.

My invention relates to aircraft and particularly to aircraft of the heavier than air type and it has for an object to provide an aeroplane which shall be capable of transporting extraordinarily heavy and unusually large loads and which shall at the same time possess an unusually high aerodynamic efficiency.

Figure 1:
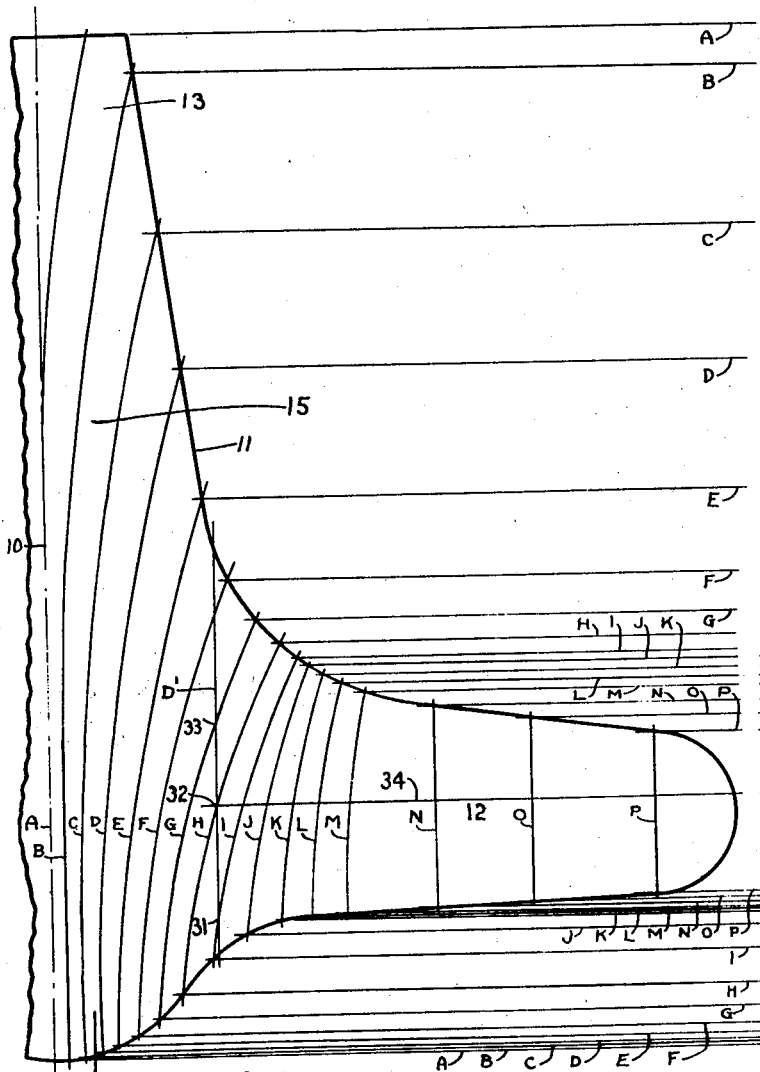
Figure 2:
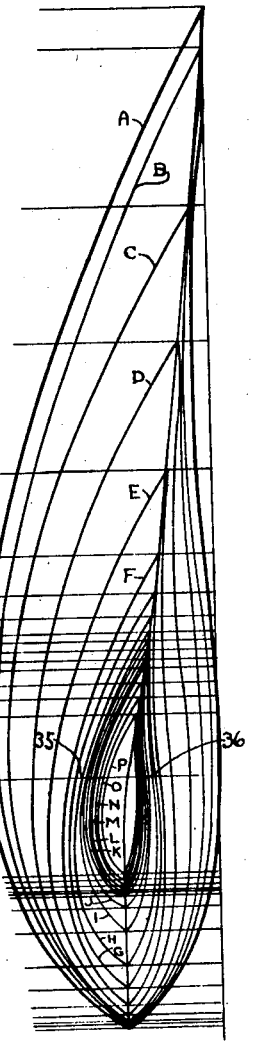
Figure 5:
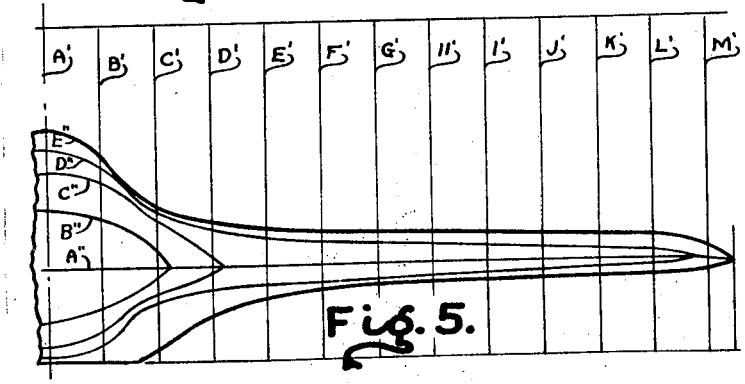
Figures 3, 4:
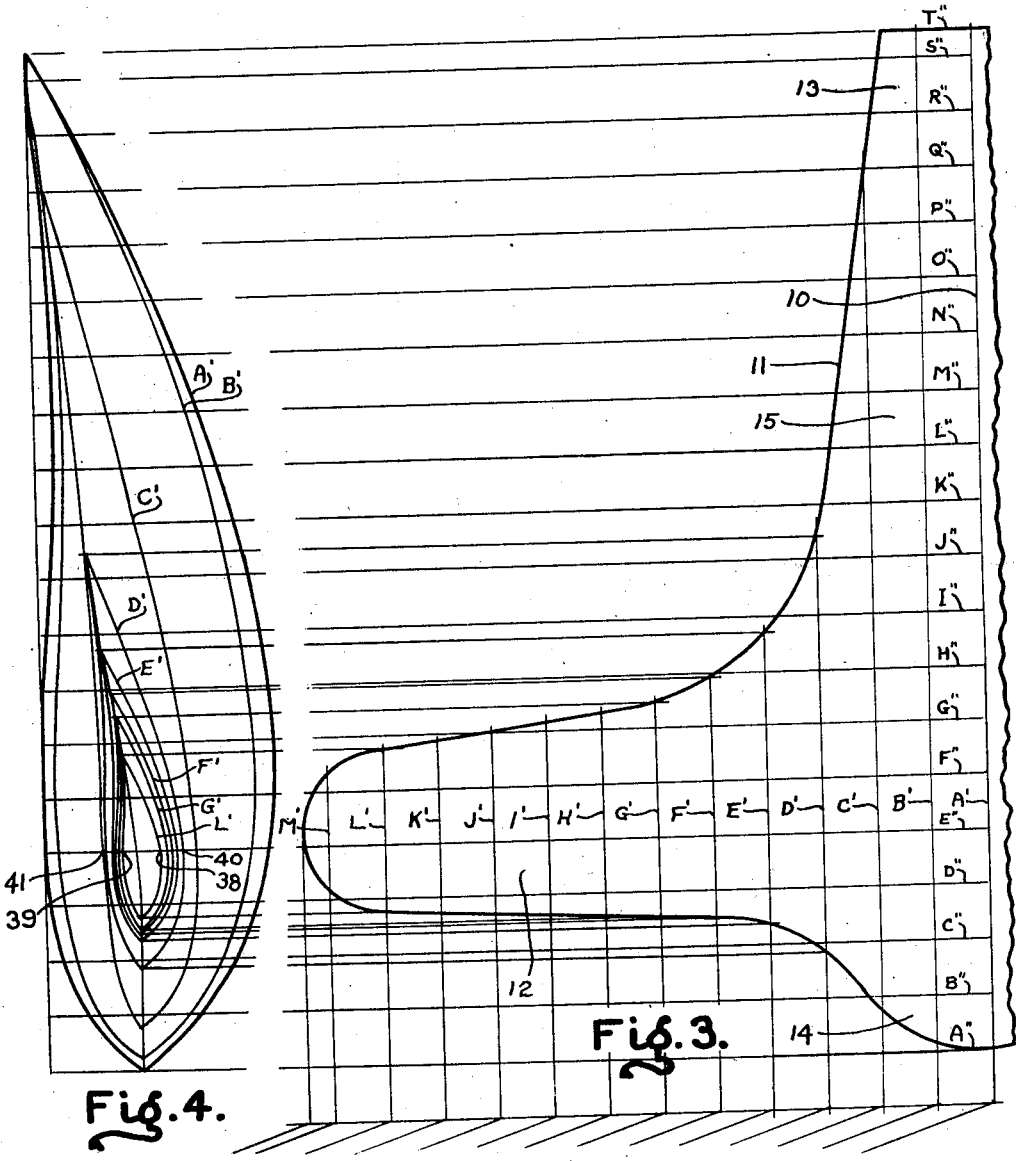
Figure 6:
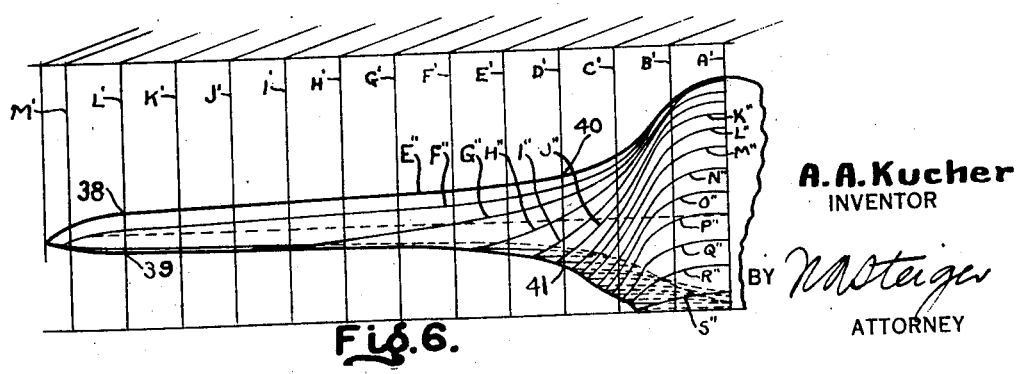
Figure 7:
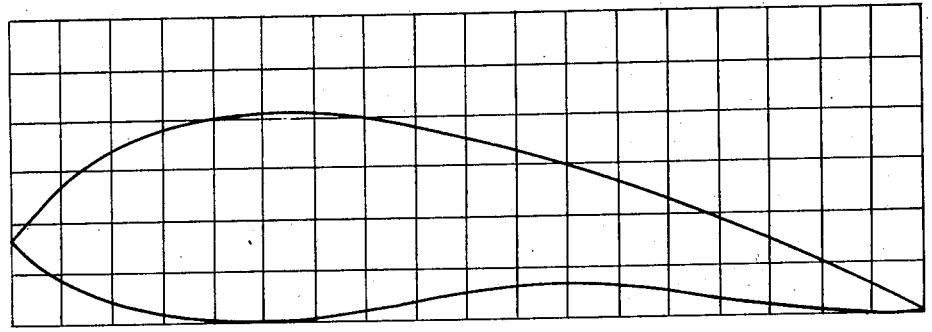
Figure 8:
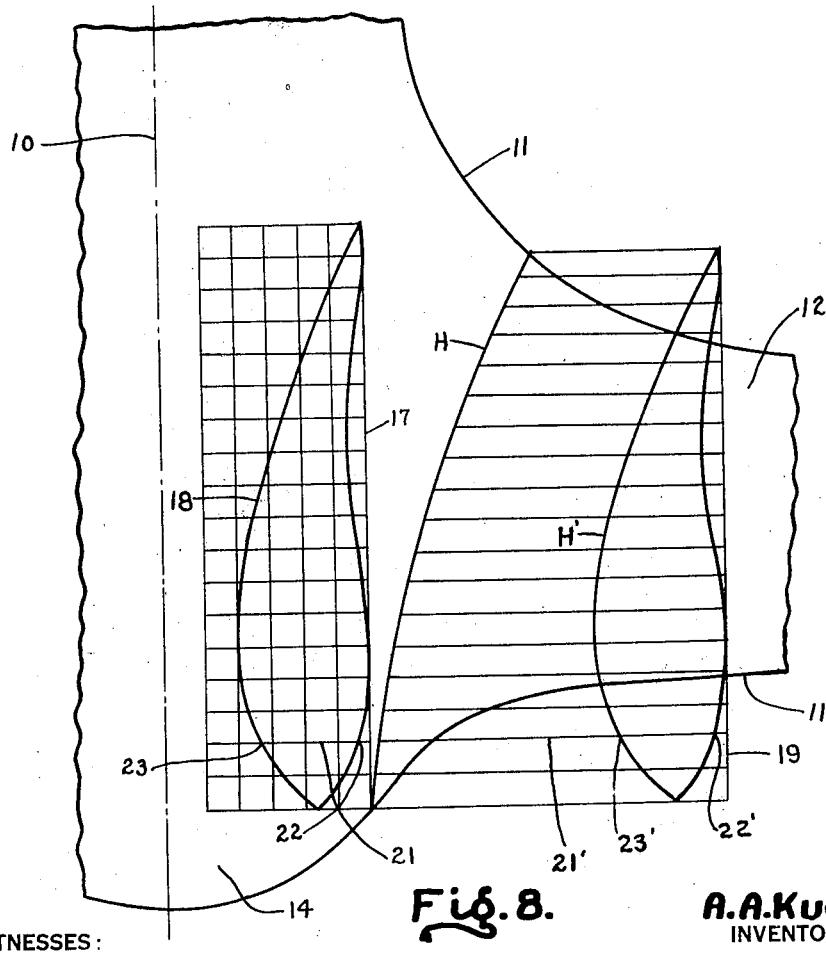
Figure 9:
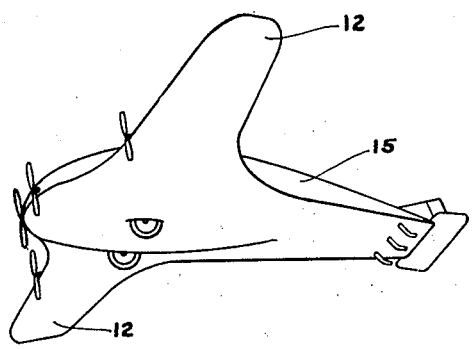
Figure 10:
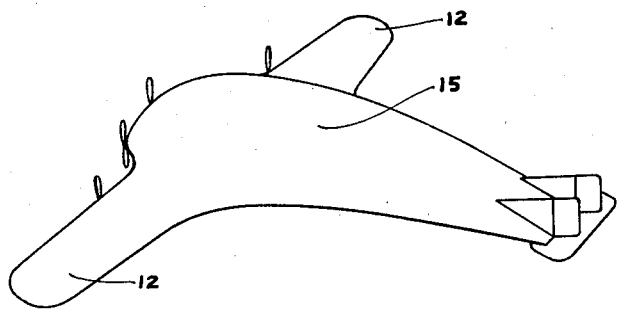

These and other objects, which will be made apparent through the further description of my invention, may be obtained by the employment of the apparatus hereinafter described and illustrated in the accompanying drawings in which Fig. 1 is a plan view of the right side of one form of aeroplane constructed in accordance with my invention and showing the lines of air flow; Fig. 2 is a view showing projected sections taken on the various lines of air flow as given in Fig. 1; Fig. 3 is a plan view of the left side of the aeroplane showing transverse and longitudinal frame lines; Fig. 4 is a view showing longitudinal sections taken on the various longitudinal frame lines given in Fig. 3; Figs. 5 and 6 are views showing transverse sections taken on the various transverse frame lines given in Fig. 3; Fig. 7 is a view showing the master aerofoil section upon which the design is based; Fig. 8 is a diagrammatic view showing the method utilized for obtaining the developed and projected sections on the various lines of air flow; Fig. 9 is a perspective view looking at the underside of an aeroplane constructed in accordance with my invention and Fig. 10 is a perspective view looking at the top side of the same aeroplane.

It has heretofore been the general practice in the design and construction of aeroplanes to so form the wing portions that their cross-sections, taken along the lines of air flow, comply, in section, with some standard and well-known sustaining section or aerofoil selected as giving the highest aerodynamic efficiency in relation to the specified speed, lifting capacity and climbing ability of the plane. On the other hand, it has been the practice to design the body, fuselage or hull portion with principal regard for air resistance and interior capacity, the various body sections being so formed as to produce a stream-line effect. As a result, the performance characteristics of the plane are almost entirely dependent upon the wing portions and, in order to lift and transmit heavier loads, it becomes necessary to increase the wing area. However, it is obvious that, for large capacity passenger or freight carrying types, the structural limitations are such that the wing area cannot be increased indefinitely.

I have therefore conceived of an aeroplane wherein not only the wing portions but the body portion as well is designed with regard to the highest obtainable aerodynamic efficiency. Both the body and wing portions are so shaped that various cross-sections taken along different lines of air flow coincide with a master cross-section. This master cross-section is usually similar to the section of some standard aerofoil, the aerodynamic efficiency of which is very high and at the same time accurately determinable in a manner well understood in the art. By the term "lines of air flow" is meant lines which graphically indicate the stream line of the air over the various surfaces of the aeroplane at normal speed. In view of the fact that not only the wing portions but the entire or most of the body portion as well conforms with a master areofoil, it is possible to construct aeroplanes having far greater effective wing area, without increasing the wing spread, thereby obtaining greater lifting capacity. I have also found that the interior body spaces of planes designed in accordance with my invention are materially increased.

Following, is an example of one method which I may employ in constructing an aeroplane in accordance with my invention. Referring to Fig. 1, 10 indicates the longitudinal centerline of a plane which, in plan view, has a contour line such as 11. The wing portion of the plane is represented at 12, the tail portion at 13, the nose portion at 14 and the body portion at 15. The contour line 11 is determined somewhat arbitrarily from previous aerodynamic design experience, its principal dimensions, namely, the spread of the wings and the length of the body, being determined by the specified capacity of the plane. The next procedure consists in laying off the lines A, B, C, D, etc., which indicate graphically the direction of air flow over the wing and body portions, with particular reference to the top surface. These lines, for the present, are also somewhat arbitrarily determined from past experience and prior knowledge of air flow over irregular forms. The direction of the lines of air flow, as will be apparent, is determined, in the present example, by the shape of the top surfaces and while the arbitrarily determined air flow lines A, B, C, D, etc., are shown as being inclined outwardly with respect to the longitudinal center line and the vertical plane of symmetry of the aircraft from the front toward the rear portion of the aircraft, nevertheless it will be obvious that the shape or form of the upper surfaces may be such as to incline the lines of air flow differently with respect to the longitudinal axis and the vertical plane of symmetry of the aircraft.

In the present example, the lines A, B, C, etc., shown in Fig. 1 indicate the direction of air flow over the upper surfaces of the body and wing portions. It is generally accepted in the art that sixty percent to eighty percent of the sustaining effort is created by the upper wing surface so that if a master aerofoil section is selected in which the upper surface creates nearly all of the sustaining effort, the design of the aeroplane may be based almost entirely upon the direction of air flow over this surface. This has been done in the present example. However, it is perfectly obvious that the design may be based upon the direction of air flow over the lower surface or, ideal results may be had by basing the design upon the direction of air flow over both the upper and lower surfaces, wherein corresponding lines of air flow over the upper and lower surfaces define various cross-sections which are formed in accordance with the master section.

The next step consists in selecting the master section shown in Fig. 7. An aerofoil section of such shape is selected as will give the highest aerodynamic efficiency in relation to the specified operating characteristics of the plane and is determined in a manner which is practiced at the present time in the design of the wing portions only. In the present example, substantially all of both the body and wing portions is designed in accordance with this single master aerofoil section. However, in some instances, I may design the wing portion in accordance with one master aerofoil section and part or the entire body portion in accordance with another master aerofoil section. Then again, I may design different parts of the body portion in accordance with different aerofoil sections in order to obtain certain general body dimensions, the body, as a whole, being capable of exerting effective lift or of augmenting the action of the wings during normal flight.

The master aerofoil section having been selected, sections coinciding therewith are laid out on each of the lines of air flow A, B, C, D, etc., shown in Fig. 1. These sections may be termed the developed sections taken along the respective lines of air flow, and the section taken on the line H has been shown in Fig. 8 for illustrating the method employed.

Referring to this figure, it will be seen that a line 17 parallel to the center line 10 is first laid off. The length of this straight line is equal to the length of the curved air flow line H. This line is then divided into a selected number of divisions and the usual ordinates and abscissas plotted, whereupon, with the length of the line 17 as a basis, a section 18 is developed which is similar to the master section shown in Fig. 7. The section 18 is the developed section of the air flow line H, that is, it is a section taken along the curved line H but shown as lying in a flat plane.

A datum line 19 parallel to the centerline 10 is then laid off and the air flow line H divided into the same number of divisions as the line 17. The divisions upon the line H are then projected across upon the line 19, the length of the line 19 being determined by the projection. As the air flow line H is equal in length to the line 17, and as the number of divisions of each line is equal, there is a corresponding abscissa, such as 21, for each projecting line 21'. Taking the lines 21 and 21' as an example, the distances of the points 22 and 23 from the line 17 are laid off from the datum line 19 upon the corresponding projecting line 21 and the points 22' and 23' obtained. This method is repeated for each of the projecting lines until sufficient points have been obtained to plot the section H', which is the projected section, that is, it is a section taken parallel to the longitudinal centerline 10 but projected from the angularly disposed curved air flow line H. This is the section shown in Fig. 2, the foregonig process being repeated for each air flow line in order to obtain its corresponding projected section.

Reference is now made to Fig. 3 which is symmetrical to Fig. 1 and shows the other half of the plane. Upon this figure, parallel longitudinal frame lines A', B', C', etc., are laid off. The next procedure consists in determining the sections A', B', C', etc., shown in Fig. 4, which are sections taken along the respective longitudinal frame lines and which are designated by corresponding reference letters. The overall lengths of the sections A', B', C', etc., are derived by projecting from Fig. 3 in the manner illustrated. The contours of the sections are determined by the manner illustrated in Figs. 1 and 2 in which a single longitudinal frame line, D', has been shown by way of example. The longitudinal frame line D' is laid off in Fig. 1 and found to be superimposed upon the lines of air flow F, G, H, and I, and the points of intersection, 31, 32, 33, etc., determined. These points of intersection are then projected upon the projected sections shown in Fig. 2, the point 32, for example, located on the line of air flow H being projected by a line 34 across the corresponding section H'. The points of intersection 35 and 36 of the line 34 with the section H give the depth of the longtiudinal section as well as its relation to the other sections at the point 32 on D'. The transverse line 34 is then projected across to Fig. 4 and the depth of the section D' on that line laid off. This procedure is followed for all of the points of intersection 31, 32, 33, etc., until the shape of the longitudinal section D' is completely determined. A similar procedure is followed in determining all of the other longtiudinal sections shown in Fig. 4.

The next procedure consists in laying off, upon Fig. 3, transverse frame lines A'', B'', C'', etc., from which the corresponding transverse sections are determined, the forward sections A'' to E'' being shown in Fig. 5 and the remaining or after sections being shown in Fig. 6. The transverse sections are easily obtained from Fig. 4. Taking transverse section E'' for example, and referring to Fig. 4, the points 38 and 39 indicate the depth of the transverse section upon the longitudinal frame line L', while the points 40 and 41 indicate the depth of the transverse section upon the longitudinal frame line D'. Corresponding points upon all of the other longitudinal frame lines may be obtained in a similar manner for the transverse frame line E'' from Fig. 4 and plotted in Fig. 6. By plotting a curve through the points 38, 39, 40, 41, etc., the transverse section E'' is completely determined. This procedure may then be followed for each of the transverse frame lines as shown in Figs. 5 and 6. Attention is invited to the fact that the transverse sections may also be obtained from the projected sections in a manner similar to that employed in developing the longitudinal sections.

The contour or shape of each longitudinal and transverse section having been completely determined, a model is readily constructed in accordance with those sections which, when completed, has both its body and wing portions so formed that a cross-section taken along any of the indicated lines of air flow corresponds with the master section shown in Fig. 7. This model is then given wind tunnel tests and its lift divided by drift or L/D characteristic obtained. Wind indicators are then fitted to the model in order to obtain the correct or actual directions of the air flow lines. Pilot tubes or manometers may also be employed in order to determine the relative wind pressures at various points on the surface of the aeroplane in a manner well understood in the art. The model may also be submitted to smoke tests in verifying the previous findings.

From the foregoing tests, the corrected direction of air flow may be accurately determined. With these corrected air flow lines as a basis, new longitudinal and transverse sections may be determined in the same manner previously utilized and heretofore described in obtaining the model sections. From the longitudinal and transverse sections last obtained, the actual aeroplane may be constructed.

From the foregoing description, it will be apparent that aeroplanes constructed in accordance with my method of manufacture have a higher aerodynamic efficiency in that not only the wing portions, but the entire body portion as well, conforms, in the direction of air flow, with a master aerofoil section selected and known to give the highest efficiency in relation to the specified operating characteristics of the plane. In this way, the wing portions are materially augmented by the body portion so that greater lifting capacity for a given wing spread is easily obtainable.

Attention is now invited to Figs. 9 and 10 which are views, in perspective, of an aeroplane constructed in accordance with my invention. In this aeroplane, any section taken along the lines of air flow both in the wing portions 12 as well as the body portion 15 is similar to the master aerofoil section shown in Fig. 7. Special attention is invited to the shape of the body portion 15 from which it will be seen that the design lends itself especially to the provision of extraordinary large interior cargo carrying spaces. Furthermore, I have found that the parasitic resistance is substantially eliminated.

It is therefore apparent that I have invented a novel form of aeroplane which has a greater aerodynamic efficiency than aeroplanes heretofore constructed. Furthermore, I have devised a novel method for manufacturing a plane of this character, and although other methods of manufacture may be employed to produce a plane embodying my basic inventive idea, nevertheless it is to be understood that the method described herein is given merely as an example and that other methods resorted to obtain the same ultimate results are mere equivalents of the method described. While I have described an aeroplane in which the entire body portion is designed in accordance with a master aerofoil section, nevertheless it is to be understood that it is within the purview of my invention to design only a portion of the body in this manner or to design any other portion of the aeroplane in accordance with the master aerofoil section so as to augment the action of the wing portions. While for purposes of illustration, I have shown a monoplane, it is obvious that my invention is equally adaptable to aeroplanes having a plurality of sustaining surfaces.

While I have shown my invention in but one form, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. An aircraft having a longitudinally-extending body portion and transversely-extending wing portions, the body portion having some of its surface so shaped that the air passes thereover in directional lines curved in one general direction only with respect to the vertical plane of symmetry of the aircraft and the body portion being so formed that cross sections taken, respectively, along said directional lines of air flow are similar and correspond to a preselected lifting master aerofoil section.

2. An aircraft having a longitudinally-extending body portion and transversely-extending wing portions, the body portion having one of its sustaining surfaces shaped so as to direct the flow of air thereover in a plurality of directional lines inclined with respect to the longitudinal axis of the aircraft, said body portion being so formed that each cross section taken along an aforesaid line of air flow corresponds with a master aerofoil section formed to direct a greater quantity of air over its upper surface than over its under surface so as to exert a lifting action.

3. An aircraft having a longitudinally-extending body portion and transversely-extending wing portions merging therewith, the body portion having its upper sustaining surface shaped so as to direct the flow of air thereover in a plurality of directional lines bent in a single general direction only with respect to the vertical plane of symmetry of the aircraft, said body portion being so formed that each cross section taken along an aforesaid line of air flow corresponds with a master aerofoil section.

4. An aircraft having a longitudinally-extending body and transversely-extending wings merging therewith, one of the sustaining surfaces of the body as well as a portion of the wings being so formed as to direct the flow of air thereover in a plurality of directional lines inclined in one direction only with respect to the longitudinal axis of the aircraft, said body and wing portions being so formed that each cross section taken along an aforesaid line of air flow extends vertically and corresponds with a master aerofoil section.

5 An aircraft having a longitudinally-extending body portion and transversely-extending wing portions merging therewith, the body portion having its upper sustaining surface so shaped as to direct the flow of air thereover in a plurality of directional lines inclined in one direction only with respect to the longitudinal axis of the aircraft and inclined with respect to each other, said body portion being so formed that each cross section taken along an aforesaid line of air flow corresponds with a master aerofoil section.

In testimony whereof, I have hereunto subscribed my name this 20th day of December, 1926.

ANDREW A. KUCHER.